United States Patent [19]
Taylor

[11] Patent Number: 5,862,258
[45] Date of Patent: Jan. 19, 1999

[54] METHOD FOR DISTINGUISHING BETWEEN OBJECTS USING MACE FILTERS

[75] Inventor: Travis S. Taylor, Somerville, Ala.

[73] Assignee: The United States of America as represented by the Secretary of the Army, Washington, D.C.

[21] Appl. No.: 744,703

[22] Filed: Nov. 4, 1996

[51] Int. Cl.[6] .............................. G06K 9/74; G02B 27/46
[52] U.S. Cl. ........................ 382/210; 382/211; 359/561
[58] Field of Search .................................. 382/195, 209, 382/210, 211, 278; 359/561

[56] References Cited

U.S. PATENT DOCUMENTS 5,185,815  2/1993  Brandstetter ............................ 382/211

Primary Examiner—Scott Rogers
Attorney, Agent, or Firm—Hugh P. Nicholson; Freddie M. Bush; Hay Kyung Chang

[57] ABSTRACT

A pair of matched filters describing a pre-selected category of objects is made, each of the filters having a center located at a unique place in the filter. When incorporated into a MACE filter and used in an optical correlator, a line drawn through the correlation peaks caused by the centers of the matched filter pair and a pre-selected axis together produce an angle that is indigenous to that particular category of objects, thus identifying the category of objects.

3 Claims, 2 Drawing Sheets

OUTPUT PLANE

METHOD FOR DISTINGUISHING BETWEEN OBJECTS USING MACE FILTERS

DEDICATORY CLAUSE

The invention described herein may be manufactured, used and licensed by or for the Government for governmental purposes without the payment to me of any royalties thereon.

BACKGROUND OF THE INVENTION

Using a Vander Lugt optical correlator, a pre-selected category of objects can be detected in a given scene and through the use of minimum average correlation energy (MACE) filters, a search can be made simultaneously for more than one category of objects in the given scene. Such an ability to perform simultaneous search offers obvious advantages in settings such as a battlefield. If a battle scene had to be searched once for a tank and then for a plane and other enemy vehicles in succession, the searching process can indeed be tedious and time-consuming. MACE filters allow many various categories of objects to be searched for at once in the same scene; however, the output of the correlator that uses the MACE filters only shows that there is or is not at least one of the categories. The output does not distinguish between different categories of objects.

SUMMARY OF THE INVENTION

By using two filters, both being descriptive of a pre-selected category of object yet each having a center which is located at a unique portion of the filter, i.e. center 103 is located at the upper right-hand corner of filter 100 whereas center 105 is located at the lower left-hand corner of filter 107, in accordance with the invented method, different categories of objects can be detected and distinguished. When these two filters are combined into one MACE filter and used in an optical correlator, centers 103 and 105 produce two correlation peaks 109 and 111 in the output plane if the input scenery contains an object within the pre-selected category. A line through these two peaks and either the horizontal or vertical axis of the MACE filter together create a unique angle that is indigenous to that pre-selected category of objects.

DESCRIPTION OF THE PREFERRED EMBODIMENT

Figure 1B:
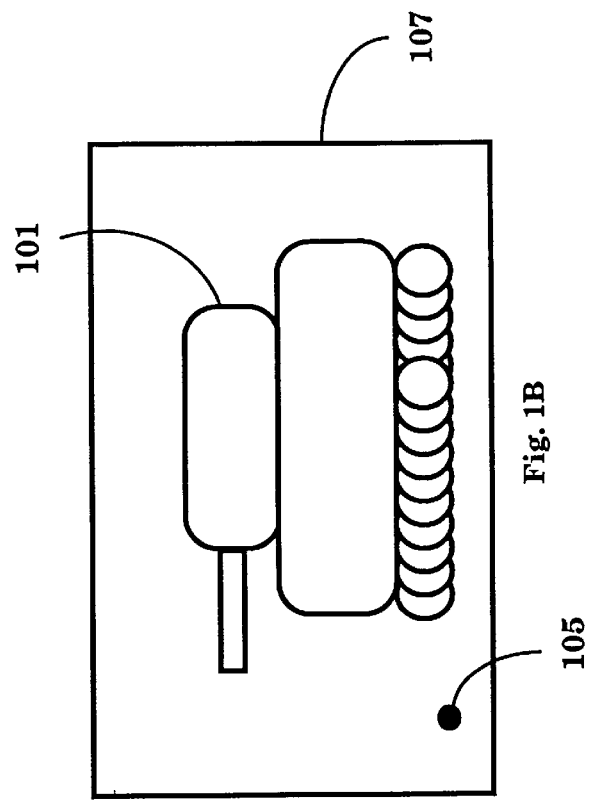
FIGS. 1A and 1B depict a pair of filters, each describing a tank and having a center at a different position of the respective filter.

Referring now to the drawing wherein like numbers represent like parts in each of the figures, the method for distinguishing between objects using MACE filters is explained.

Figure 1A:
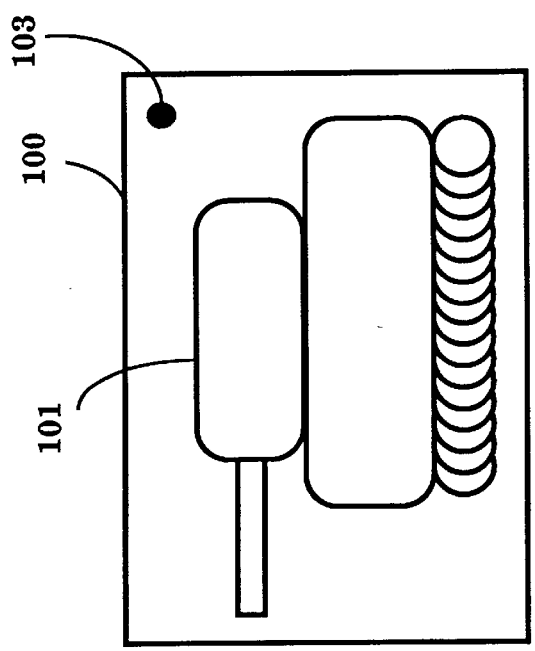
Figure 1C:
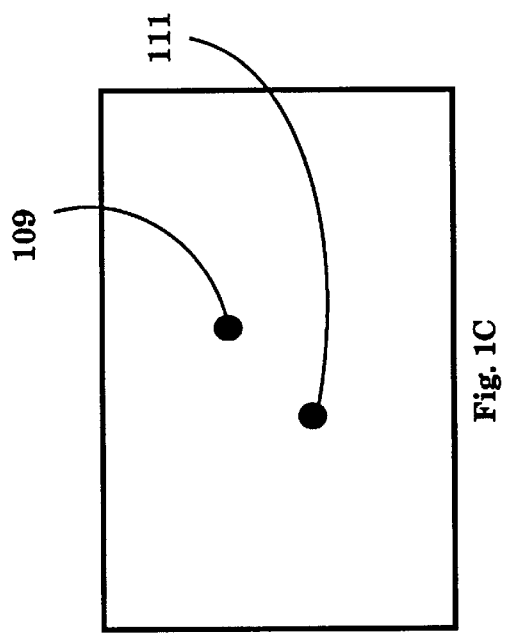
FIG. 1C shows an exemplary appearance of the correlation peaks corresponding to filters 100 and 107.
Figure 2:
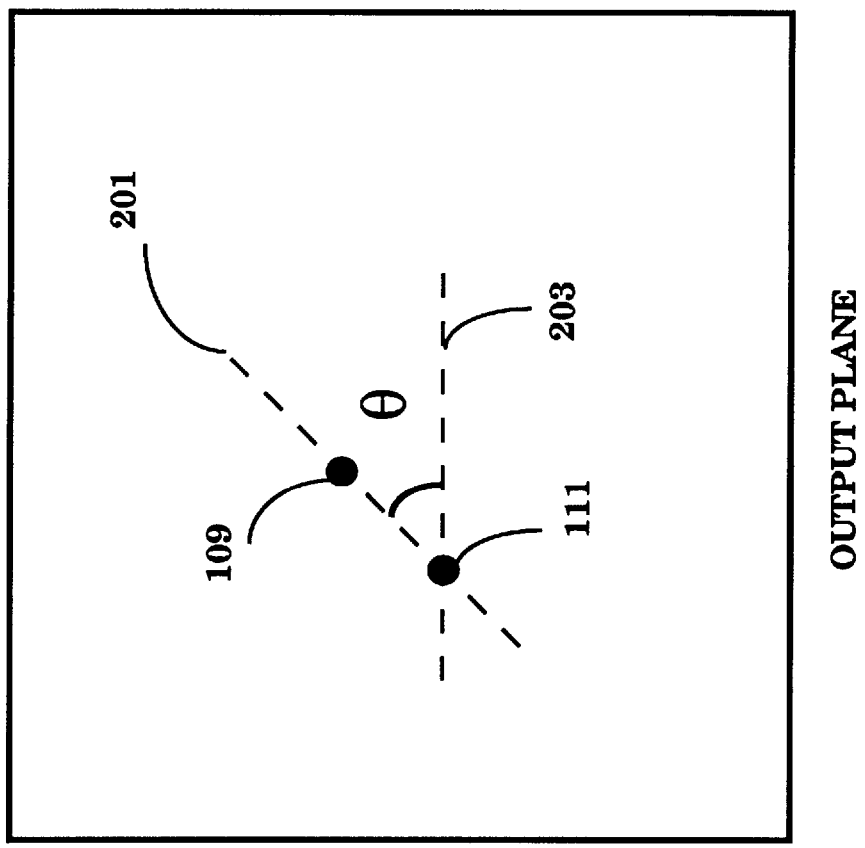
FIG. 2 illustrates the creation of the unique angle, $\Theta$.

First, a matched filter is made for a pre-selected category of objects. In making such a filter, the computer transform algorithm used in making the filter requires that a center for the filter be chosen. In FIG. 1A, center 103 is positioned in the upper right-hand corner of filter 100, the filter being descriptive of tank 101. When used in a correlator, a correlation peak 109 appears on the output plane. This peak can occur anywhere on the output plane but its position relative to the tank in the input scene will be the same as the position of the center relative to the tank image in the filter. Filter 100 is then multiplied by the inverse Fourier transform of two delta functions which are at pre-determined angle $\Theta$ with respect to each other. Another filter 107 is made of the same tank and is combined with filter 100 into a MACE filter. Center 105 of filter 107 is located in a portion of the filter such that correlation peak 111 corresponding to filter 107 appears on the output plane so as to create angle $\Theta$ between line 201 drawn through correlation peaks 109 and 111 and horizontal axis 203 as shown in FIG. 2. A vertical axis may be used in conduction with line 201; however, once the determination has been made to use one axis in creating each pair of filters, the same axis must be used to determine the angle between the axis and the line drawn through the correlation peaks in the output plane of the MACE filter.

A pair of filters can be created in this manner describing any category of objects, each pair having a correlation angle $\Theta$ that is unique to that category of objects. The several filter pairs are then combined into one MACE filter which, when used with a conventional four-focal length or matched filter optical correlator, can detect and distinguish between different categories of objects.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A method for performing detection and distinction of several different categories of objects in a given scene, said method comprising the steps of:

a) creating a pair of matched filters for each respective category of objects;

b) producing a synthetic substitution filter for each respective category from the matched filters for that category;

c) combining the synthetic substitution filters into one MACE filter;

d) displaying the MACE filter on the filter plane of an optical correlator; and e) observing any emergent delta functions and measuring the angle between the functions, the angle being indicative of a unique category of objects.

2. A method as set forth in claim 1, wherein said producing step comprises multiplying each of the matched filters by the inverse Fourier transform of two delta functions, the functions being at a pre-determined angle with respect to each other.

3. A method as set forth in claim 2, wherein no two pre-determined angles are identical.

* * * * *